Oct. 14, 1930.                    M. L. ECKMAN                      1,778,628
                             CURRENT CARRYING DEVICE
                           Filed April 8, 1929        2 Sheets-Sheet 1
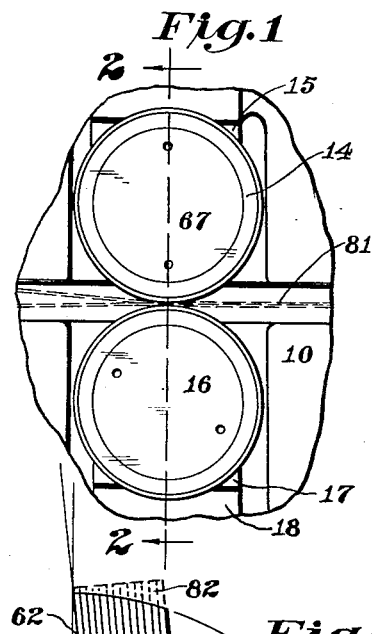
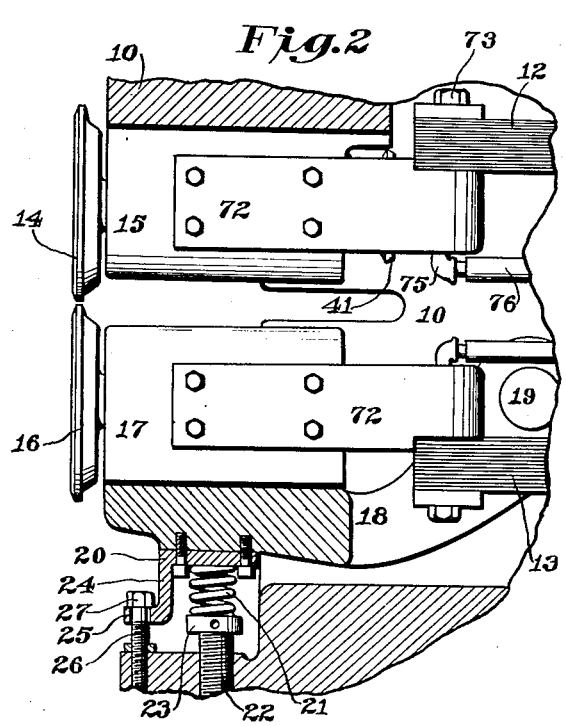
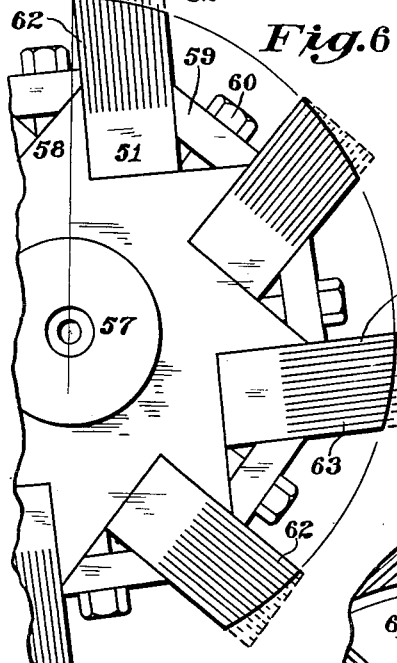
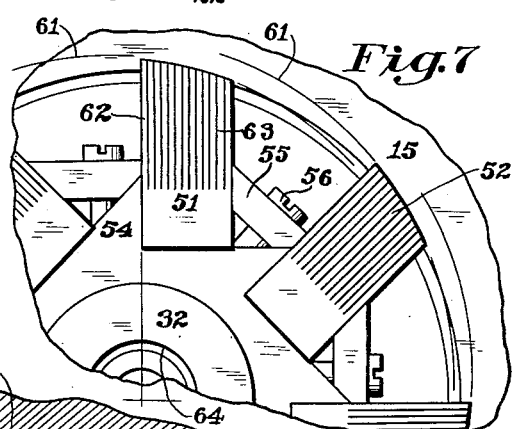
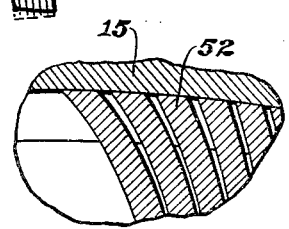
INVENTOR
M. L. Eckman.
BY C. R. Halbert.
E. L. Davis.
ATTORNEYS.

Oct. 14, 1930.　　M. L. ECKMAN　　1,778,628
CURRENT CARRYING DEVICE
Filed April 8, 1929　　2 Sheets-Sheet 2
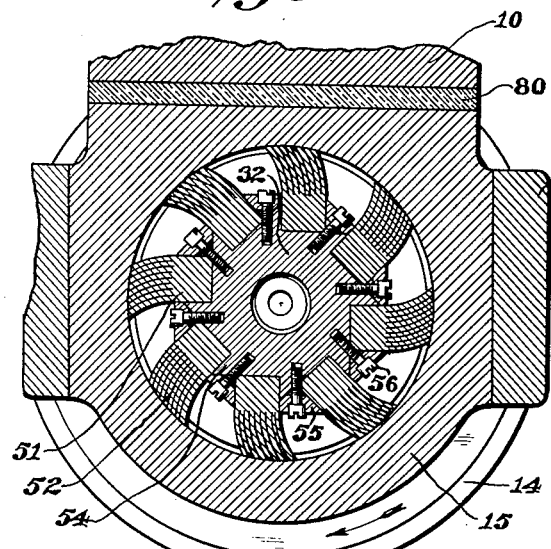
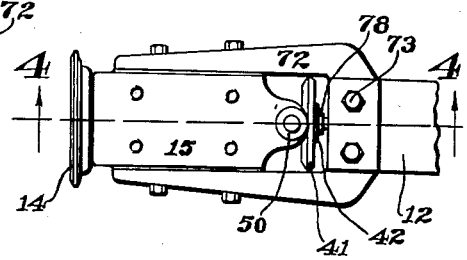
INVENTOR
M. L. Eckman
BY C. R. Halbert
E. L. Davis
ATTORNEYS.

Patented Oct. 14, 1930

1,778,628

UNITED STATES PATENT OFFICE

MERIL L. ECKMAN, OF DETROIT, MICHIGAN, ASSIGNOR TO FORD MOTOR COMPANY, OF DEARBORN, MICHIGAN, A CORPORATION OF DELAWARE

CURRENT-CARRYING DEVICE

Application filed April 8, 1929. Serial No. 353,278.

The object of my invention is to provide a current carrying device of simple, durable and inexpensive construction.

A further object of my invention is to provide a current carrying device which will be especially adapted for use with a seam welder to conduct the welding current to the electrode rollers. The ordinary seam welder for either tubing or sheets consists of a driving electrode roller and a free electrode roller. The driving roller is usually rotatably mounted in fixed position relative to the welding machine while the free roller is usually rotatably mounted on a bracket which is adjustable in relation to the other roller so that varying pressures and thicknesses of stock may be used. Each of these rollers are connected to the secondary terminals of a welding transformer and the sheets to be welded are run between the rollers thereby completing the circuit and welding the sheets at the line of contact with the rollers.

The rollers perform the same function in seam welding as stationary electrodes perform in ordinary spot welding. In fact, due to the alternating current impulses, the weld produced is nothing more than a series of spot welds which overlap each other and thereby form a continuous line of welds or a seam weld.

Probably the most difficult problem in seam welding is the conducting of the current from the transformer secondary leads to the rotating electrode rollers. The seam welding of ordinary sixteen gage steel stock requires a current of approximately 20,000 amperes and consequently the ordinary method of conducting this current by the conventional brush arrangement has proven expensive, inefficient and unwieldy.

Up to the present, ordinary brushes have had to be used with a conventional slip ring which has been secured to the welding roller spindle. A plurality of conventional stationary brushes are disposed around this slip ring and secured to the driving head of the machine. It has, of course, been necessary to make this slip ring of a very large size for carrying this enormous amount of current and consequently the welding machines have been very cumbersome and unwieldy affairs.

Still a further object of my invention is to provide a current carrying device which consists of a plurality of current carrying brushes secured to a welding roller spindle in position to rotate relative to and inside of a stationary slip ring. It will be seen that the extent of the periphery of the slip ring controls to a large degree the amount of current which the device is capable of handling and that when the slip ring is placed on the outside of the brushes a very much larger slip ring surface may be obtained in a given space.

Still a further object of my invention is to provide a type of brush which consists of a series of laminations arranged within the slip ring so that each lamination is free to exert a pressure against the slip ring independent of the other laminations of the brush. In this device a plurality of laminated brushes are disposed radially around a central spindle, each brush being so machined that when the brush assembly is inserted into the slip ring the outer portion of each brush will be distorted into a fan shaped structure thereby permitting each lamination to exert a pressure against the slip ring independent of the other laminations of the brush.

Laminated brushes for carrying current have been used for some time, but up to the present the sole function of the laminations have been to act as a spring so as to urge the brush as a unit against the commutator or slip ring. In the applicant's device the laminations of each brush are distorted into a fan shaped structure thereby providing a space between each lamination at the outer edge thereof, the purpose of which is to insure to each lamination independent contact with the slip ring independent of the other laminations. The applicant's device is so arranged that the laminations may be spread at their points of contact with the slip ring and still each lamination will maintain a point of contact with the slip ring which function is believed impossible with any arrangement of brushes disposed around the outside of a conventional slip ring or commutator.

Still a further object of my invention is to provide a laminated current carrying brush arranged so that each lamination is free to exert a spring pressure against the slip ring independent of the other laminations of the brush. It has been almost universal practice to provide current carrying brushes with an exterior spring for urging them into contact with the slip ring or commutator. In the applicant's device no exterior springs are required for this purpose, the inherent flexibility of each lamination being used to exert a constant spring pressure against the slip ring.

Still a further object of my invention is to provide a current carrying device which consists of a series of current carrying brushes arranged radially around a cental spindle, the periphery of each brush having been previously machined to an arc having its center rearwardly of the plane of the rear edge of the brush, and mounted on the spindle so that the center of the spindle is in the plane of the rear edge of the brush.

Still a further object of my invention is to provide a current carrying device which consists of a spindle having brushes radially mounted thereon, a slip ring enclosing the brush assembly, a cover for each end of the brush assembly and means for flowing water through the brush assembly to thereby keep the brushes cool.

With these and other objects in view, my invention consists in the arrangement, combination, and construction of the various parts of my improved device, as described in the specification, claimed in the claims, and illustrated in the accompanying drawings, in which:

Figure 1 shows a front elevation of the electrode rollers used in connection with my improved device.

Figure 2 shows a sectional view taken on the line 2—2 of Figure 1, parts being shown in full to better illustrate the construction.

Figure 3 shows a top view of the roller driving head illustrating the means by which the transformer leads are connected to this head.

Figure 4 shows a sectional view taken on the line 4—4 of Figure 3.

Figure 5 shows a sectional view taken on the line 5—5 of Figure 4.

Figure 6 shows an end view of an arbor having brushes secured thereto in position for machining.

Figure 7 shows a similar view of the electrode roller spindle having brushes previously machined by the method shown in Figure 6 mounted thereon.

Figure 8 shows an enlarged sectional view taken on the line 8—8 of Figure 4, and Figure 9 shows a partial sectional view taken on line 9—9 of Figure 4, illustrating the line of contact produced by each brush lamination with the commutator ring.

Referring to the accompanying drawing, I have used the reference numeral 10 to indicate generally the body of a seam welding machine. A pair of secondary transformer leads 12 and 13, respectively, extend from the conventional welding transformer housed in the body 10 in position to be secured to my current carrying device.

An upper electrode roller 14 is rotatably mounted in an upper head 15 which is mounted rigidly to the body 10. A lower electrode roller 16 is rotatably mounted in a lower head 17 which is secured to an arm 18, the latter being pivotally mounted by means of a pin 19 to the body 10 so that the position of the rollers 14 and 16 may be varied with relation to each other. The upper roller 14 is positively driven through suitable gearing, to be described later. The lower roller 16 is rotatably mounted but is not positively driven.

The arm 18 is provided with a bracket 20 which is secured to the under side thereof and which forms a spring seat and stop member. A coil spring 21 extends between this bracket 20 and an adjusting screw 22 in position to urge the arm 18 upwardly thereby forcing the roller 16 in the direction of the roller 14. The adjusting screw 22 is threaded into the body portion 10 and has a head 23 which forms a lower spring seat for the spring 21. By varying the height of the adjusting screw 22 varying spring pressures may be obtained between the rollers 14 and 16.

An arm 24 extends downwardly from the bracket 20 and has an ear 25 extending outwardly from its lower end. The ear 25 is provided with a suitable opening for receiving an adjustable stop member 26 which in the form of the device here shown consists of an ordinary bolt threaded into the body portion 10. A head 27 on the bolt 26 limits the upward movement of the arm 18 so that the rollers may be adjusted for varying thicknesses of stock and so that the rollers will not be permitted at any time to come in contact with each other.

The foregoing describes a seam welder having a driven upper roller rotatably mounted in a head which is fixed to the body of the welding machine, a free lower roller which is also rotatably mounted in a head and which is pivotally mounted in relation to the body 10 and is urged against the upper roller by a suitable spring but is restrained from actually contacting with this roller by an adjustable stop member.

Secondary leads from a welding transformer associated with the machine are connected to each of these heads by means which will be described later. The welding current is fed from one of the transformer leads to one of the heads then through my improved current carrying device to one of the electrode rollers and then through the stock to be welded. The current then is carried by the other roller to its adjacent head and finally to the other transformer lead. If the electrode rollers 14 and 16 were ever permitted to contact with each other the device would be short circuited and damage would be done to the surface of the welding rollers.

Referring to Figure 4, the head 15 is made in the form of a sleeve, the interior bore forming an internal slip ring. The forward end of the head 15 is closed by an inwardly extending cup shaped disk 28. A similar disk 29 is provided at the rear end of the head 15 and suitable ball bearings 30 and 31 are mounted in the cupped part of the disks 28 and 29, respectively.

A driving spindle 32 is rotatably mounted within the head 15 by means of the ball bearings 30 and 31 and extends through each of the disks 28 and 29 so that the roller 14 may be secured to the forward end of this spindle and a suitable drive gearing may be secured to the rear end thereof.

A packing ring 33 is provided on the spindle 32 adjacent to the disk 28 and a packing plate 34 presses this ring 33 against the disk 28 and spindle 32 thereby forming a water tight joint between the flange and the spindle.

The outer race of the ball bearing 30, although secured in the disk 28, is insulated therefrom by means of insulating members 35. The inner race of the ball bearing 35 is secured to the spindle 32 against a shoulder 36 by means of a spacing ring 37 and the roller 14.

A second packing plate 38 forms the outer enclosure for the ball bearing 30. A second packing ring 39 is mounted in the plate 38 in the conventional manner and presses against the outer surface of the spacing ring 37. These two packing rings, 33 and 39, effectively prevent dirt or other material from entering the chamber around the bearing 35 and also prevents the cooling medium used within the head 15 from entering this chamber.

The rear disk 29 is practically identical with the forward flange 28 and has a pair of packing rings 44 and 45 similar to the packing rings 33 and 39, respectively, and these rings are likewise held in place by packing plates 46 and 47 which are similar to the packing plates 34 and 38, respectively. The function of the disk 29 is identical with that of the disk 28, the bearing 31 being insulated by means of the insulation 48. The only difference in these two flanges is in the proportion and sizes of the various parts.

The rear end of the spindle 32 is provided with a spline 40 and a gear 41 is secured on these splines by means of a spanner nut 42 which locks the gear 41, the inner race of the bearing 31, and a spacer 43 against a suitable shoulder on the spindle 32.

A bevel driving pinion 49 is rotatably mounted in an ear 50 extending from the head 15 in position to mesh with the driven gear 41. A spur gear, chain or other form of drive could very readily be adapted to this device, the bevel gear and pinion drive being shown as merely one of the many ways in which the roller 14 may be driven.

Briefly, the mechanism just described consists of a head member provided with a cylindrical bore and having a disk enclosing each end. A ball bearing is mounted in each of the flange members and is insulated therefrom. These ball bearings support a spindle 32 which is provided with an electrode roller on its forward end and a drive gear on its rear end, the latter being suitably driven by a driving pinion. These ball bearings are protected from dust and dirt which might enter from the outside of the device and from the cooling medium which would tend to enter from the inside to thereby prolong the life of the bearing.

The center portion of the spindle 32 between the packing rings 33 and 44 is of a star shaped section having teeth 54 arranged so that suitable brushes 51 may be mounted on these teeth. These brushes 51 are built up from a number of laminations 52 which are soldered together at their base to form a practically unitary structure for about one third of their height. A series of radial slots 53 are provided through each brush so that the complete assembly consists of a solid base having a plurality of teeth extending outwardly, these teeth being composed of a series of laminations. The brushes 51 are clamped onto the star teeth 54 of the spindle 32 by means of the clamp 55 and the screws 56.

Referring to Figure 6, a machine arbor 57 is provided with a number of longitudinal teeth 58 which are machined with one face of the tooth forming a slight angle with a line drawn through the center of the arbor. A rectangular shaped brush, as illustrated by the dotted lines 82 in Figure 6, is clamped to this face of the arbor teeth 58 by means of the clamps 59 and the screws 60. The face of the brush adjacent to the tooth 58 does not extend through the center of the arbor but forms a slight angle with a line extending through the center. The series of brushes being clamped in this arbor, the brushes are then turned and ground with the center of the arbor as the center of the arcuate faces of each brush. The laminations are in their normal straight positions during this machine operation.

The completed brush is now assembled on the spindle 32 adjacent to the teeth 54 so that the face of the brush in contact with the tooth 54 will extend through the center of the spindle. When the brushes 51 are assembled in this position it will be noted that the periphery of the brushes do not fall within a single circle, but rather, each brush describes its own particular arc, as illustrated by lines 61 in Figure 7.

The diameter of the bore in the head 15 is made slightly smaller than the circle described by the innermost points on the periphery of the brushes 51. It is therefore impossible to assemble the spindle 32 and the brushes 51 into the head 15 until the brushes have been distorted from their free positions.

Referring to Figure 8, it will be seen that the brushes are distorted so that the spindle assembly may be inserted in the bore in the head 15. The rear edge 62 of the brush 51 being higher than the forward edge 63, it must be distorted further rearwardly to adapt itself to this bore. The remaining laminations progressively vary in length between these two extremes and therefore each lamination beginning with lamination 63 is distorted slightly more than the preceding lamination. This distortion produces a fan shaped brush in which each lamination is free to exert a pressure against the bore of the head 15. It may also be seen that by progressively increasing the distortion a space is provided between the outer edges of each lamination so that the inherent spring action of each lamination will not be hindered by the preceding lamination.

When the laminations wear to the contour of the head or slip ring 15 each lamination 52 has a line of contact, somewhat greater than the thickness of the lamination, as illustrated in Figure 9. Each lamination is free to act as an individual brush having an individual spring for producing a pressure on the slip ring. This feature forms the basis of the applicant's device and is the means through which he is able to carry a much greater amount of current through a given size of brush than was formerly thought possible.

The current carrying capacity of these brushes is further increased by means of a cooling fluid which keeps their temperature low and thereby insures high electrical conductivity.

The spindle 32 is provided with a bore 64 extending therethrough and through which the cooling medium is conducted to the roller 14 and to the brushes 51. The roller 14 is of a built-up structure, being dished inwardly at its central part where it is screwed onto the outer end of the spindle 32 by means of a screw thread 65. A diaphragm 66 is disposed in the dished portion of this roller 14 and is held in place by a cover 67 which is screwed into the dished portion of the roller and forms the outer wall thereof.

A sleeve 68 is secured to the central part of the diaphragm 66 and extends into the bore 64 in the spindle 32. The inner end of the sleeve 68 is enlarged at 69 to snugly fit the bore 64. Considerable clearance is allowed around the sleeve 68 between the enlarged portion 69 and the diaphragm 66. A plurality of radial openings 70 are provided in the spindle 32 just forwardly of the enlarged portion 69 and rearwardly of the packing member 33. The diaphragm 66 is provided with a number of openings 71 placed near its outer edge.

A U shaped conducting bar 72 straddles the head 15 and has its arms securely fastened to this head. One transformed lead 12 is secured to the center part of this conducting bar 72 by means of the bolts 73. The proportions of this bar and the areas of contact between it and the head 15 are so proportioned that there is very little current lost between the head and the transformer lead.

An opening 74 is provided in the central part of the bar 72 and is connected to a suitable cooling medium source by means of the fittings 75 and the tubes 76. A gland sleeve 77 extends into the opening 64 in spindle 32 so that the spindle may be free to rotate around it and is threaded into the bar 72 and connects with the opening 74. A packing gland 78 is threaded into the inner end of the spindle 32 and secures a packing 79 in place to form a liquid tight joint between the sleeve 77 and the spindle 32.

Water is ordinarily provided as a cooling medium and is forced through the tube 76, fittings 75, opening 74, and sleeve 77 into the bore 64 of the spindle 32. It is then conducted through the bore in the sleeve 68 where it distributes itself radially to the outer edge of the roller 14 between the diaphragm 66 and the cover 67. The fluid is then forced through the openings 71 and returns to the bore 32 by way of the space between the diaphragm 66 and the inner wall of the roller 14. Due to the enlarged portion 69 of sleeve 68, the fluid is forced through the openings 70 in the spindle 32 into the bore in the head where it contacts with the brushes 51. The fluid is then exhausted through a suitable opening in the head 15, preferably near its inner end.

The description of the upper head only has been given because the construction of the lower head is practically identical with it. The spindle, electrode roller, brushes and bearings are the same and the means for cooling these parts are also the same. Means are not provided for driving the lower roller, but .if such a drive is desired it could easily be accomplished in the manner used to drive the upper roller.

Each of the heads 15 and 17 are insulated from the body portion 10 and arm 18, respectively, by a fibre or other insulting member 80.

The operation of the device is as follows:

The lower head 17 is adjusted by means of the screw 22 and the stop screw 26 to the correct position for the sheets that are to be welded. The pinion 49 is then rotated which rotates the gear 41 and the upper roller 14. The primary current is then switched on at the transformer and this impresses a low voltage, high amperage current on the rollers 14 and 16 by means of the current carrying device just described. The sheets of stock, which are shown by the dotted lines 81, in Figure 1, are then fed between the rollers 14 and 16 thereby completing the secondary circuit. A series of overlapping spot welds is thus produced in the sheet 81 which forms a continuous welded seam.

If it is desired, this device may be used with direct current by substituting a generator or other source of direct current in place of the transformer. The welding line will then, of course, be a continuous seam weld in contrast to the series of spot welds produced when a transformer is used. A similar device may also be used for tube welding.

Among the many advantages arising from the use of my improved device it may be well to point out that I have provided a current conducting device wherein it is possible to conduct current of approximately 20,000 amperes to the welding rollers of a seam welder and which may be housed in a very limited space. A further advantage results in that the current conducting brushes are composed of a series of laminations arranged within a slip ring so that each lamination is free to exert a pressure against the ring independent of the other lamination or the brushes.

Still a further advantage results in that the welding rollers are cooled by a fluid which is then conducted to the current carrying brushes and which in turn cools these brushes.

Some changes may be made in the arrangement, construction, and combination of the various parts of my improved device without departing from the spirit of my invention, and it is my intention to cover by my claims such changes as may reasonably be included within the scope thereof.

I claim as my invention:

1. In a current carrying device, a slip ring, a spindle rotatably mounted within said slip ring, and a plurality of laminated brushes secured to said spindle in position to co-act with said slip ring the periphery of the brushes being machined to an arc which does not coincide with the arc of the slip ring.

2. In a current carrying device, a slip ring, a spindle rotatably mounted within said slip ring, and a plurality of laminated brushes secured to said spindle in position to co-act with said slip ring the periphery of said brushes having been previously machined to an arc having a center not coinciding with the axis of the spindle and being mounted on said spindle so that the center of said spindle is in line with the rear edge of said brush.

3. A current carrying device, a slip ring, a spindle rotatably mounted within said slip ring, a plurality of brushes secured to said spindle in position to co-act with said slip ring, an electrode roller mounted on the outer end of said spindle, and means for conducting a cooling fluid through said spindle then into said electrode roller and then around said brushes and finally out through said slip ring.

4. In a current carrying device, a slip ring, a disk mounted on each end of said slip ring, a bearing mounted in each of said disks, a spindle rotatably mounted in said bearings, a plurality of brushes mounted on said spindle in position to co-act with said slip ring, means for conducting a cooling fluid around said brushes, and means for preventing said cooling fluid from coming in contact with said bearing.

5. In a current carrying device, a stationary slip ring having a spindle rotatably mounted therein, a movable slip ring having a second rotatable spindle mounted therein, a pair of electrode rollers mounted on the outer ends of said spindles, brushes mounted on the intermediate portions of said spindles in position to co-act with said slip rings, respectively, and means for conducting current to said slip rings.

6. In a current carrying device, a slip ring, a spindle rotatably mounted within said slip ring, and a laminated brush secured to said spindle in position to co-act with said slip ring, the individual laminations for said brush being so proportioned that they exert unequal pressures on said slip ring.

7. In a current carrying device, a slip ring, a spindle rotatably mounted within said slip ring, and a laminated brush secured to said spindle in position to co-act with said spring, the leading lamination of said brush exerting a lesser pressure on the slip ring than each succeeding lamination.

8. In a current carrying device, a slip ring, a spindle rotatably mounted within said slip ring, and a laminated brush clamped to said spindle in position to co-act with said slip ring, the clamped portion of the laminations being in contact with each other and the contacting periphery of said brush being distorted so that a space exists between each lamination at their outer ends to thereby insure uniform contact of each lamination with the slip ring.

9. In a current carrying device, a slip ring, a spindle rotatably mounted within said slip ring, and a laminated brush secured to said spindle in position to co-act with said slip ring, the periphery of the brush being machined so that when it is assembled to the spindle within the slip ring the leading lamination will be less distorted than each succeeding lamination.

MERIL L. ECKMAN.